US010358066B2

(12) United States Patent
Liu

(10) Patent No.: US 10,358,066 B2
(45) Date of Patent: Jul. 23, 2019

(54) SEAT SYSTEM FOR A MOTOR VEHICLE AND METHOD FOR OPERATING A SEAT SYSTEM OF A MOTOR VEHICLE

(71) Applicant: AUDI AG, Ingolstadt (DE)

(72) Inventor: Jun Liu, Beijing (CN)

(73) Assignee: AUDI AG, Ingolstadt (DE)

( * ) Notice: Subject to any disclaimer, the term of this patent is extended or adjusted under 35 U.S.C. 154(b) by 13 days.

(21) Appl. No.: 15/520,354

(22) PCT Filed: Oct. 21, 2014

(86) PCT No.: PCT/IB2014/065490
§ 371 (c)(1),
(2) Date: Apr. 19, 2017

(87) PCT Pub. No.: WO2016/063107
PCT Pub. Date: Apr. 28, 2016

(65) Prior Publication Data
US 2017/0313228 A1 Nov. 2, 2017

(51) Int. Cl.
*A47C 7/28* (2006.01)
*B60N 2/50* (2006.01)
*B60N 2/58* (2006.01)
*B60N 2/72* (2006.01)
*B60N 2/02* (2006.01)

(52) U.S. Cl.
CPC ............. *B60N 2/72* (2013.01); *A47C 7/28* (2013.01); *B60N 2/502* (2013.01); *B60N 2/5825* (2013.01); *B60N 2002/026* (2013.01)

(58) Field of Classification Search
CPC ........ B60N 2/72; B60N 2/502; B60N 2/5825; A47C 7/28
USPC ........................................... 297/284.2
See application file for complete search history.

(56) References Cited

U.S. PATENT DOCUMENTS 2,152,628 A    7/1937  Gauthey et al.
2,692,010 A *  10/1954 Bernard ................ A47C 1/033
                                              297/284.2 X
5,352,021 A *  10/1994 Kunczynski .......... A47C 7/16
                                              297/284.2

FOREIGN PATENT DOCUMENTS

JP          2001-327358 A1   11/2001

OTHER PUBLICATIONS

International Search Report for PCT/IB2014/065490 dated Jul. 7, 2015.
PCT/IB2014/065490, Jan. 21, 2014, Jun Liu, AUDI AG.

* cited by examiner

*Primary Examiner* — Anthony D Barfield
(74) *Attorney, Agent, or Firm* — Staas & Halsey LLP

(57) ABSTRACT

A seat part which includes a cushion foam spanned by a seat cover is part of a seat system having an adjusting device by which flexibility of the seat part is variable. The adjusting device includes at least one guy device, disposed in a guy trench of the seat system, having a guiding element attached to an outer area of the seat cover and movable relative to the cushion foam between a first position relaxing the seat cover and a second position tensioning the seat cover or varying the flexibility of the seat part.

11 Claims, 4 Drawing Sheets

SEAT SYSTEM FOR A MOTOR VEHICLE AND METHOD FOR OPERATING A SEAT SYSTEM OF A MOTOR VEHICLE

CROSS REFERENCE TO RELATED APPLICATIONS

This application is the U.S. national stage of International Application No. PCT/IB2014/065490, filed Oct. 21, 2014, claims the benefit thereof and incorporates by reference herein in its entirety.

BACKGROUND

Described below is a seat system for a motor vehicle and a method for operating a seat system of a motor vehicle, as well as a motor vehicle with a seat system.

The comfort feeling of a vehicle occupant is essentially determined by the flexibility or the stiffness of a seat part of a seat system of a motor vehicle, on which the vehicle occupant is seated. A particularly uniform pressure distribution above all in the bottom area of the vehicle occupant is advantageous if he has taken a seat on a seat system of a motor vehicle. Therefore, some vehicle or seat system manufacturers offer seat systems with a wrinkled seat cover. By the wrinkled seat cover some flexibility of the seat cover and thus also of the seat part is achieved such that it is perceived as particularly comfortable by a vehicle occupant. However, this is disadvantageous in that the optical impression of the entire seat system suffers by the wrinkled seat cover. In particular with leather-covered seat systems, there is the problem that after some use, the leather stretches by itself and thus wrinkles. This increases the seat comfort, but unfortunately worsens the optical impression of the seat system due to the wrinkling of the leather cover.

JP 11075983 A discloses a composite cushion for a chair which is arranged within a frame and connected to the frame by a wire. Several pulleys are mounted at the frame by which the tension of the wires can be varied such that the seating comfort of the chair can be varied.

U.S. Pat. No. 4,858,992 discloses a seat, whereby an apparatus is mounted within the seat, which includes a plurality of belts extending laterally across the seat. A plurality of sensors, one associated with each of the belts, is provided to detect the shape and position of selected portions of the user's torso on the seat. A control circuit, responsive to the sensors, controls the movement of sliders mounted within channels of the apparatus to control the length and shape of the belts to vary the length of the belts such that the belts and the overlying seat fabric is adapted to a person sitting on the seat.

GB 2 405 580 B discloses a seat for motor vehicles, having two components, respectively a seat back and a seat base, wherein at least one of the components has a rigid frame and flexible straps arranged within the frame to support a zone of a user's body, the straps having an adjustment device to adjust the tension during use to maintain the support tension desired by the user.

DE 10 2008 028 791 A1 shows a seat for a car, whereby a foam of the seat can be compressed to vary the stiffness of the seating surface.

SUMMARY

Described below is a particularly comfortable and optically attractive seat system for a motor vehicle.

This seat system for a motor vehicle as well as a method for operating a seat system for a motor vehicle are described below.

The seat system for a motor vehicle described herein includes a seat part, which includes a cushion foam spanned by a seat cover, and an adjusting device, by which flexibility of the seat part is variable. To provide a particularly comfortable and also optically attractive seat system for a motor vehicle, the adjusting device includes at least one guy device disposed in a guy trench of the seat system, wherein a guiding element of the guy device is attached to an outer area of the seat cover and is movable relatively to the cushion foam between a first position relaxing the seat cover and a second position tensioning the seat cover for varying the flexibility of the seat part.

A pressure distribution between the seat cover and the underlying cushion foam can be adapted in a particularly simple manner, because the seat cover can be more or less severely applied to the cushion foam according to need by moving the guiding element of the guy device relatively to the cushion foam between the first position relaxing the seat cover and the second position tensioning the seat cover. If a vehicle occupant has taken a seat on the seat system, the flexibility of the seat part can be varied by the adjusting device by slightly relaxing the seat cover such that it can for example also have some wrinkling, whereby the flexibility and the comfort of the seat part is overall improved. As soon as a vehicle occupant is no longer seated on the seat system, the seat cover can be moved into the second position tensioning the seat cover by the adjusting device such that the seat cover has a smooth look and thus does not exhibit wrinkling. A particularly simple possibility of providing both a particularly comfortable seat system and a particularly optically attractive seat system for a motor vehicle is provided.

An advantageous embodiment provides that the guiding element is movable in vertical direction of the seat system between the two positions, in particular in an adjustment range of 15 mm. Thereby, the seat cover can be more or less severely tensioned over the cushion foam in particularly simple manner to adequately adjust the flexibility and look of the seat part.

In further advantageous development, it is provided that the guy device has at least one retaining element, to the one end area of which the guiding element is attached and the opposing end area of which is connected to an adjusting element of the guy device via a screw connection, by which the guiding element is movable relatively to the cushion foam. For example, the guiding element can be formed as a wire, wherein the retaining element can be formed as some kind of hook in this case, in which the guiding element formed as a wire is received and fixed. By rotating the adjusting element, the retaining element is translationally moved along with the guiding element attached thereto, whereby the guiding element together with the retaining element is moved relatively to the cushion foam and thus also relatively to the adjusting element. A rotational movement on the adjusting element is thus converted into a translational movement of the guiding element, wherein the guiding element can be particularly exactly and simply moved relatively to the cushion foam in this manner to adjust the flexibility of the seat part by moving the seat cover relatively to the cushion foam between the first position relaxing it and the second position tensioning the seat cover. A particularly compact and simply operable adjustment possibility for tensioning and relaxing the seat cover is provided via the screw connection.

According to a further advantageous embodiment, it is provided that the guy device has at least one housing element fixed to the cushion foam, in which the fixing element is disposed rotatably with respect to the housing element. For example, the housing element can be formed of plastic and have multiple ribs on its outside, which effectively prevent relative movement between the housing element and the cushion foam. In other words, the housing element is thus securely fixed to the cushion foam such that it provides some kind of anchor on the seat system side for the adjusting device and the concerned guy device, respectively. With a cushion foam formed of foam material, the housing element can for example be produced during the manufacturing process of the cushion foam, thus during a foaming operation, already integrated in it and together with the cushion foam.

According to a further advantageous embodiment, it is provided that the guy device has an actuator, by which the guiding element is movable relatively to the cushion foam between the first position relaxing the seat cover and the second position tensioning the seat cover. Thus, the flexibility of the seat part can be adjusted by the actuator in particularly simple and comfortable manner. For example, a corresponding operating element can be provided on the seat system, by which the actuator is operable such that the guiding element of the guy device is movable relatively to the cushion foam in motor-operated manner between the first position relaxing the seat cover and the second position tensioning the seat cover. Alternatively or additionally, the actuator can also be connected to a corresponding sensor system, by which it can be acquired whether or not the seat system is currently occupied by a vehicle occupant. The actuator can be formed to automatically move the guiding element into the position relaxing the seat cover if the seat system is occupied by a person, and to move the guiding element into the second position tensioning the seat cover if the seat system is not occupied by a person. Moreover, it is also conceivable that a pressure exerted by a vehicle occupant on the seat part is measured by a sensor system, wherein the actuator automatically adjusts the flexibility of the seat part depending on the measured pressure—which significantly depends on the weight of the concerned vehicle occupant and the contact surface of the vehicle occupant on the seat part. Thus, the flexibility and therefore the comfort of the seat system can be automatically adapted to a respective weight of a vehicle occupant by the actuator.

In further advantageous development, it is provided that the adjusting device has a second guy device, which is disposed in a second guy trench of the seat system opposing the first guy trench, wherein a second guiding element of the second guy device is attached to a second outer area of the seat cover and movable relatively to the cushion foam between a first position relaxing the seat cover and a second position tensioning the seat cover for varying the flexibility of the seat part. Therein, the second guy device can be formed analogously to the first guy device. In that the two guy devices are attached to opposing ends or sides of the seat cover, it can be symmetrically tensioned and relaxed to adjust the flexibility of the seat part. Thereby, the seat cover is uniformly relieved and loaded, wherein the tension of the seat cover additionally can be particularly uniformly and exactly adjusted.

A further advantageous embodiment provides that the adjusting device includes a third guy device, which is disposed in a third guy trench of the seat system disposed substantially orthogonally to the first guy trench, wherein a third guiding element of the third guy device is attached to a third outer area of the seat cover and is movable relatively to the cushion foam between a first position relaxing the seat cover and a second position tensioning the seat cover for varying the flexibility of the seat cover. In that the third guy device is disposed substantially orthogonally to the first guy device, the seat cover can be two-dimensionally tensioned and relaxed such that the seat cover can be particularly exactly adjusted with respect to its flexibility. Moreover, wrinkling both in longitudinal and in transverse direction of the seat cover—in particular with non-occupied seat system—can be prevented by the orthogonal arrangement of the third guy device to the first guy device.

The motor vehicle includes the seat system or an advantageous embodiment of the seat system.

In the method for operating a seat system of a motor vehicle, which includes a seat part having a cushion foam spanned by a seat cover as well as an adjusting device, a flexibility of the seat part is varied by the adjusting device. The adjusting device includes at least one guy device disposed in a guy trench of the seat system, wherein a guiding element of the guy device is attached to an outer area of the seat cover and is moved relatively to the cushion foam between a first position relaxing the seat cover and a second position tensioning the seat cover for varying the flexibility of the seat part. Advantageous developments of the seat system are to be considered as advantageous developments of the method. In addition, the seat system includes means correspondingly formed for performing the method.

In an advantageous development of the method, it is provided that the guiding element is automatically moved into the position relaxing the seat cover if the seat system is occupied by a person, and the guiding element is moved into the second position tensioning the seat cover if the seat system is not occupied by a person. For example, it can be determined whether the seat system is currently occupied by a person via a seat occupancy sensor and/or a camera system and this information is, for example, communicated to an actuator, by which the guiding element is automatically moved into the position relaxing the seat cover or the position tensioning the seat cover. By this automatism, an optimum tradeoff between a comfortable flexibility of the seat part and a particularly smooth appearance of the seat cover thus optically seeming high-class is provided.

Further advantages, features and details of the seat system are apparent from the following description of exemplary embodiments, taken in conjunction with the accompanying drawings. The features and feature combinations mentioned above in the description as well as the features and feature combinations mentioned below in the description of figures and/or shown in the figures alone are usable not only in the respectively specified combination, but also in other combinations or alone without departing from the scope of the invention.

BRIEF DESCRIPTION OF THE DRAWINGS

For a further description, reference is made to the exemplary embodiments in the drawings of which.

DETAILED DESCRIPTION OF THE PREFERRED EMBODIMENTS

Figure 1:
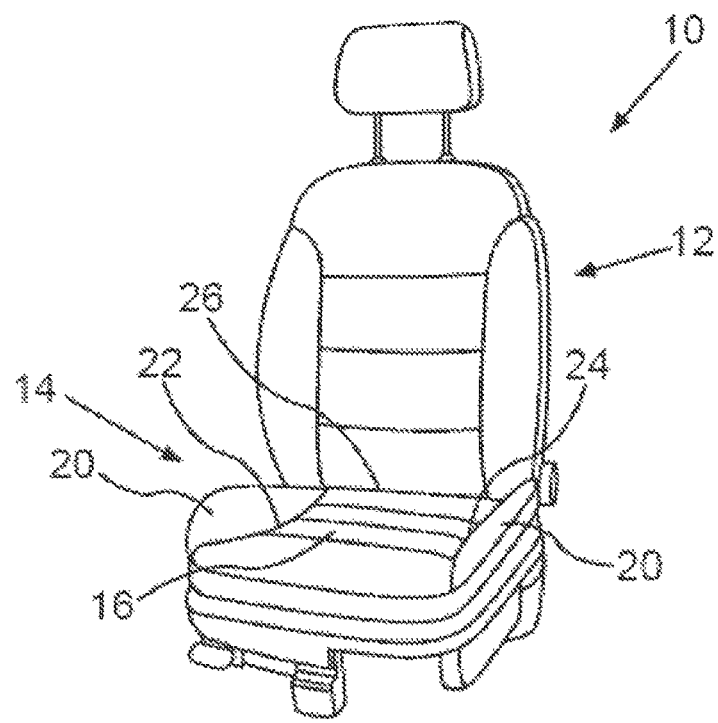
FIG. 1 is a perspective view of a seat system for a motor vehicle.

Reference will now be made in detail to the preferred embodiments, examples of which are illustrated in the accompanying drawings, wherein identical or functionally identical elements are provided with identical reference characters.

A seat system 10 for a motor vehicle is shown in a perspective view in FIG. 1. Presently, the seat system 10 is a driver's seat for a motor vehicle. However, the seat system 10 can also be a passenger's seat or a rear seat. The seat system 10 has a back part 12 and a seat part 14. The seat part 14 includes a seat cover 16, which spans a cushion foam 18 not illustrated here. In other words, the seat cover 16 is disposed above the cushion foam 18 not illustrated and recognizable here. The seat cover 16 is bounded by respective seat cushion wings 20 on the left and right side, which serve for providing a certain lateral retention. Between the back part 12 and the seat part 14 or between the seat cushion wings 20 and the seat cover 16, respective guy trenches 22, 24, 26 are provided, in which the seat cover 16 is fixed. In the present seat system 10, the flexibility of the seat part 14 can be varied.

Figure 2:
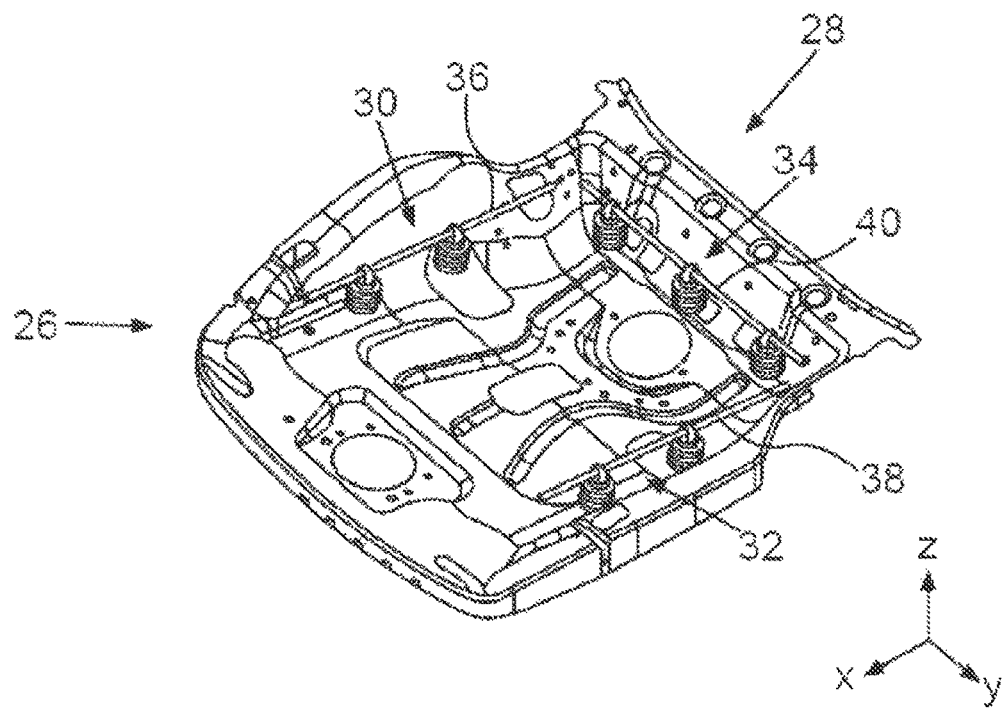
FIG. 2 is a perspective view of a seat shell of the seat system, wherein the sight to an adjusting device is unblocked, by which a flexibility of a seat part of the seat system is adjustable.

In FIG. 2, a seat shell 26 is illustrated in a perspective view, on which the cushion foam 18 here also not illustrated and the overlying seat cover 16 are disposed. An adjusting device 28 disposed in the seat shell 26 includes three guy devices 30, 32, 34 in the present case. Therein, the guy device 30 is disposed in the guy trench 22, the guy device 32 is disposed in the guy trench 24 and the guy device 34 is disposed in the guy trench 26 of the seat system 10.

The guy devices 30, 32, 34 have respective guiding elements 36, 38, 40, which are attached to respective outer areas of the seat cover 16 and movable relatively to the cushion foam 18 between a first position relaxing the seat cover 16 and a second position tensioning the seat cover for varying the flexibility of the seat part 14.

Presently, the guiding elements 36, 38, 40 are formed of wire and incorporated in or attached to respective outer areas of the seat cover 16. Therein, the guiding elements 36, 38, 40 can be moved upwards and downwards in vertical direction z of the seat system 10 between the two the positions in an adjustment range of 15 mm.

Figure 3:
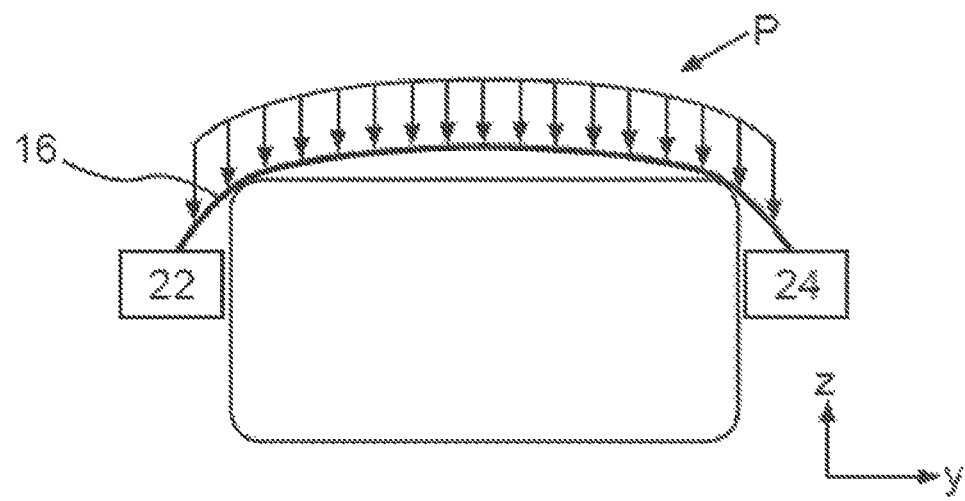
FIG. 3 is a schematic illustration, in which a cushion foam of the seat system spanned by a seat cover as well as a pressure distribution between the seat cover and the cushion foam is illustrated.

In FIG. 3, the cushion foam spanned by the seat cover 16 is schematically illustrated in a schematic sectional illustration within a plane spanned by the vertical direction z and the transverse direction y of the seat system 10. In the present illustration, the guy devices 30, 32, 34 are not shown.

By adjusting the guiding elements 36, 38 opposite to the vertical direction z of the seat system 10, the seat cover 10 is more severely applied to the cushion foam 18 and thus tensioned. By a movement of the guiding elements 36, 38 in vertical direction z of the seat system 10, the seat cover 16 is relaxed and less severely applied to the cushion foam 18. By adjusting the guiding elements 36, 38 in vertical direction z and opposite to the vertical direction z, respectively, the seat cover 16 is substantially tensioned and relaxed in transverse direction y of the seat system, respectively.

By a corresponding movement of the guiding element 40 of the guy device 34 in vertical direction z and opposite to the vertical direction z, respectively, the seat cover 16 is also relaxed and tensioned, respectively, since the seat cover 16 is either more severely or less severely applied to the cushion foam 18. By adjusting the guiding element 40, thus, the seat cover 16 is substantially tensioned or relaxed in longitudinal direction x of the seat system 10. Moreover, the adjusting device 28 can have a fourth guy device not illustrated in FIG. 2 disposed opposing the guy device 34 such that relaxing and tensioning the seat cover 16 in longitudinal direction x of the seat system 10 can also be effected by two guy devices. Alternatively, however, it is also possible that only the one guy device 34 is provided for tensioning the seat cover 16 in longitudinal direction x as in the embodiment shown in FIG. 2, wherein in this case the seat cover 16 is fixed on the front side, for example to the seat shell 16. By the explained movement of the guiding elements 36, 38, 40, thus, the flexibility of the seat part 14 can be adjusted in simple manner by varying the tension of the seat cover 16. According to whether the seat cover 16 is more severely or less severely tensioned over the cushion foam 16, a pressure distribution p can be adapted, by which the seat cover 16 is applied to the cushion foam 18. As a result, the flexibility of the seat part 14 is also varied.

Figure 4:
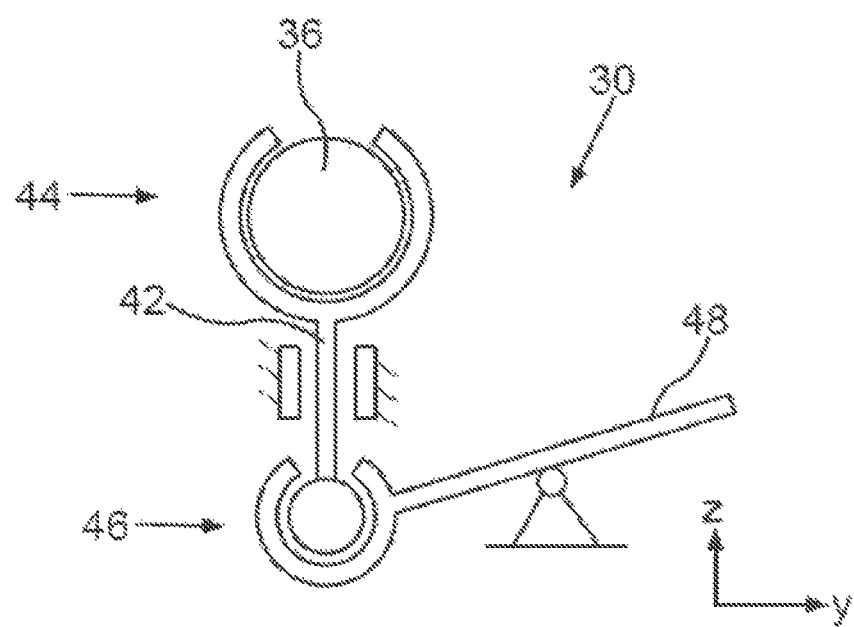
FIG. 4 is a schematic illustration of the adjusting device, by which the flexibility of the seat part is variable.

In FIG. 4, in a schematic side view, the guy device 30 is shown. The guy device 30 has a retaining element 42, to the one end area 44 of which the guiding element 36 is attached, and the opposing end area 46 of which is connected to an adjusting element 48 of the guy device 30, by which the guiding element 36 is movable relatively to the cushion foam 18, thus in vertical direction z. In the presently schematically shown case, the adjusting element 48 is formed as some kind of rocker.

Figure 5:
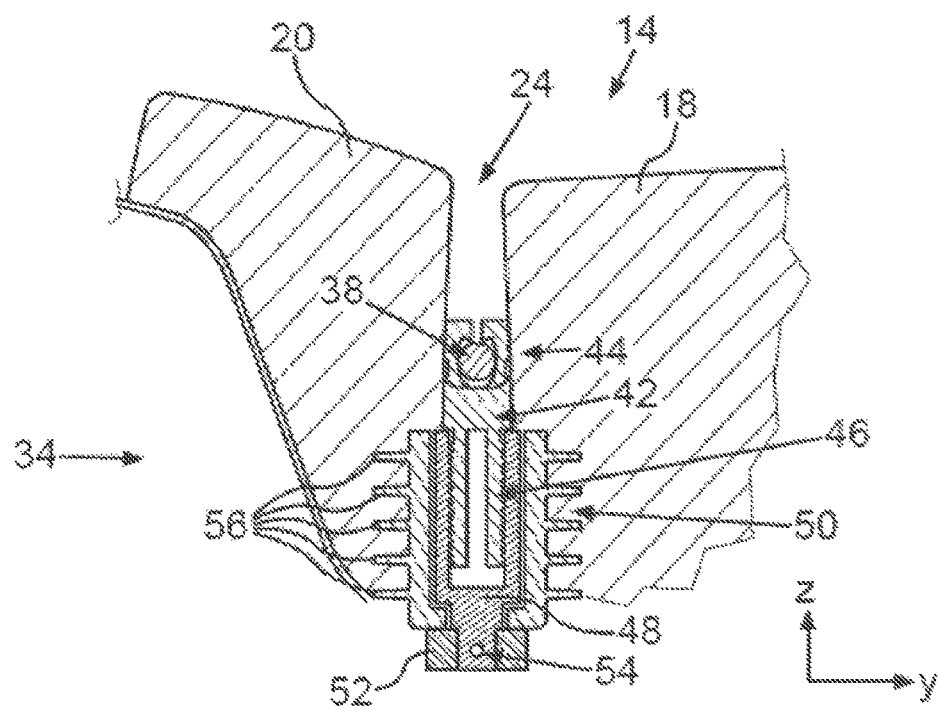
FIG. 5 is a cross-sectioned detail view of the seat system, wherein a guy device of the adjusting device disposed in a guy trench of the seat system is shown, by which the flexibility of the seat part is variable.

In FIG. 5, the seat part 14 of the seat system 10 is illustrated in a sectional plane spanned from the vertical direction z and transverse direction y. Presently, the guy device 34 is illustrated, wherein the other guy devices 30, 32 are constructed analogously to the guy device 34 shown here. The retaining element 42 is connected to the adjusting element 48 with its lower end area 46 via a screw connection, wherein the adjusting element 48 in turn is rotatably received in a housing element 50 formed of plastic. A nut 52 is attached to the bottom of the adjusting element 48 and lost-proof attached by a pin-shaped element 54. The housing element 50 has a plurality of ribs 56, via which the housing element 50 is fixed in the cushion foam 18. By rotating on the nut 52, the retaining element 42 and thus also the guiding element 38 is translationally moved in vertical direction z or opposite to the vertical direction z such that the seat cover 16 not illustrated here is either tensioned or relaxed.

Figure 6:
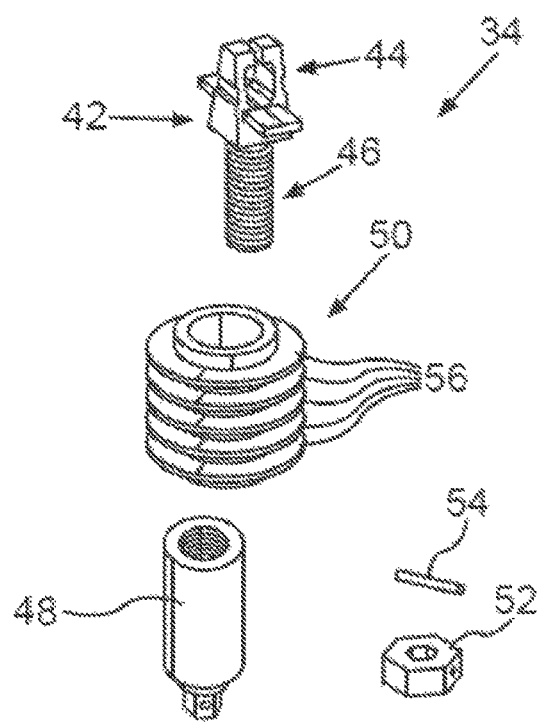
FIG. 6 is an exploded perspective view of the different components of the guy device.

In FIG. 6, the individual elements of the guy device 34 are again shown in an exploded illustration. As already mentioned, the other guy devices 30, 32 are formed analogously to the guy device 34 explained in context of FIGS. 5 and 6. As is apparent in FIG. 2, the guy devices 30, 32, 34 have multiple of the housing parts 50, in which the respective adjusting elements 48 and retaining elements 42 are disposed. Thereby, particularly uniformly tensioning and relaxing the seat cover 16 is allowed.

Therein, the respective nuts 52 of the guy device 30, 32, 34 can be connected to an actuator, by which tensioning and relaxing the seat cover 16 can be effected in motor-operated manner. Therein, the actuators not shown here are formed to automatically move the respective guiding elements 36, 38, 40 into the first position relaxing the seat cover 16 if the seat system 10 is not occupied by a person, and to move the guiding elements 36, 38, 40 into the second position tensioning the seat cover 16 if the seat system 10 is occupied by a person.

Figures 7, 8:
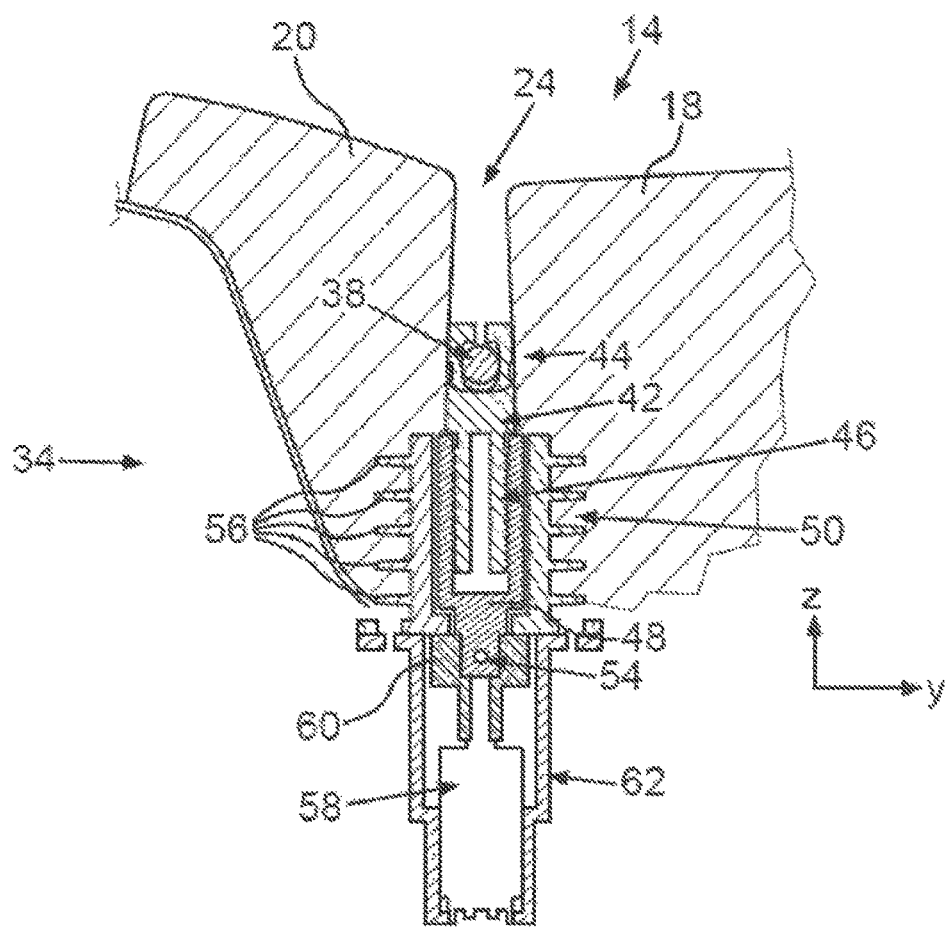
FIG. 7 is a cross-sectioned detail view of the seat system in another embodiment, wherein the seat system includes an electric motor.
FIG. 8 is a block diagram showing a closed-loop control by which the seat system can be controlled.

A sectioned detail view of the seat system 10 in an alternative embodiment is shown in FIG. 7, wherein the seat system 10 includes an electric motor 58 as the above mentioned actuator. The electric motor 58 is connected with the adjusting element 48 by of a connector 60. A housing 62 surrounds the electric motor 58 and the connector 60.

For acquiring whether or not the seat system 10 is currently occupied by a person, for example, seat sensors installed in the seat system 10 can be used. Alternatively or additionally, a camera system mounted in a vehicle interior can also be used to acquire the seat occupancy.

Moreover, it can for example also be acquired via a corresponding sensor system, which pressure is exerted on the seat system 10 by a person currently seated thereon. Depending on that, the actuators can be operated such that an optimum flexibility of the seat part 14 is adjusted. For example the occupant pressure can be setup to a target pressure value, and the target pressure TP can be obtained by a closed-loop control as shown in FIG. 8.

The closed-loop control presets the target pressure TP to a certain value and compared with a real pressure RP. The real pressure RP can be obtained by a pressure sensor 64 and is transformed by an analog-to-digital converter 66. Depending on the difference between the target pressure TP and the measured real pressure RP a control module 68 controls the adjusting device 28, whereby another analog-to-digital converter 70 interconnects the control module 68 with the adjusting device 28. In the case of a closed-loop control, the electric motor 58—as shown in FIG. 7—can be controlled by the control module 68, for instance.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

What is claimed is:

1. A seat system for a motor vehicle, comprising:
    at least first and second seat parts, each having a cushion foam spanned by a seat cover;
    a guy trench; and
    an adjusting device, varying flexibility of the first seat part, including at least one guy device, disposed in the guy trench of the seat system, having
        a guiding element attached to a first outer area of the seat cover of the first seat part and movable relative to the cushion foam between a first position relaxing the seat cover of the first seat part and a second position tensioning the seat cover of the first seat part, thereby varying the flexibility of the first seat part without any change in the second seat part;
    at least one housing element fixed to the cushion foam;
    an adjusting element disposed rotatably with respect to the housing element;
    at least one retaining element having one end area attached to the guiding element and an opposing end area connected to the adjusting element via a screw connection, by which the guiding element is movable relatively to the cushion foam.

2. The seat system according to claim 1,
    wherein the first seat part is a seat cushion, and
    wherein the guiding element is substantially perpendicular to a surface of the second seat part supportive of an occupant and is movable in a vertical direction of the seat system between the first and second positions, in an adjustment range of 15 mm.

3. The seat system according to claim 1, wherein the guy device further includes an actuator by which the guiding element is movable relatively to the cushion foam between the first position relaxing the seat cover of the first seat part and the second position tensioning the seat cover of the first seat part.

4. A seat system for a motor vehicle, comprising:
    a seat part, having a cushion foam spanned by a seat cover;
    a first guy trench;
    a second guy trench opposing the first guy trench, and
    an adjusting device, varying flexibility of the seat part, including
        a first guy device, disposed in the first guy trench of the seat system, having a first guiding element attached to a first outer area of the seat cover and movable relative to the cushion foam between a first position relaxing the seat cover and a second position tensioning the seat cover, and
        a second guy device, disposed in the second guy trench of the seat system, having a second guiding element attached to a second outer area of the seat cover and movable relatively to the cushion foam between a third position relaxing the seat cover and a fourth position tensioning the seat cover, thereby varying the flexibility of the seat part.

5. The seat system according to claim 4,
    further comprising a third guy trench positioned substantially orthogonal to the first guy trench, and
    wherein the adjusting device includes a third guy device, disposed in the third guy trench of the seat system, having a third guiding element attached to a third outer area of the seat cover and movable relatively to the cushion foam between a fifth position relaxing the seat cover and a sixth position tensioning the seat cover, thereby varying the flexibility of the seat part.

6. A seat system for a motor vehicle, comprising:
    a seat part, having a cushion foam spanned by a seat cover;
    a first guy trench;
    a second guy trench positioned substantially orthogonal to the first guy trench, and
    an adjusting device, varying flexibility of the seat part, including
        a first guy device, disposed in the first guy trench of the seat system, having a first guiding element attached to a first outer area of the seat cover and movable relative to the cushion foam between a first position relaxing the seat cover and a second position tensioning the seat cover, and a second guy device, disposed in the second guy trench of the seat system, having a second guiding element attached to a second outer area of the seat cover and movable relatively to the cushion foam between a third position relaxing the seat cover and a fourth position tensioning the seat cover, thereby varying the flexibility of the seat part.

7. A motor vehicle, comprising:
a chassis; and
a seat system, including
- at least first and second seat parts, each having a cushion foam spanned by a seat cover;
- a guy trench; and
- an adjusting device, varying flexibility of the first seat part, including at least one guy device, disposed in the guy trench of the seat system, having
  - a guiding element attached to a first outer area of the seat cover of the first seat part and movable relative to the cushion foam between a first position relaxing the seat cover of the first seat part and a second position tensioning the seat cover of the first seat part, thereby varying the flexibility of the first seat part without any change in the second seat part,
  - at least one housing element fixed to the cushion foam,
  - an adjusting element disposed rotatably with respect to the housing element, and
  - at least one retaining element having one end area attached to the guiding element and an opposing end area connected to the adjusting element via a screw connection, by which the guiding element is movable relatively to the cushion foam.

8. A motor vehicle, comprising:
a chassis; and
a seat system, including
- a first seat part having a cushion foam spanned by a seat cover,
- a first guy trench,
- a second guy trench opposing the first guy trench, and
- adjusting device, varying flexibility of the seat part, including
  - a first guy device, disposed in the first guy trench of the seat system, having a first guiding element attached to a first outer area of the seat cover and movable relative to the cushion foam between a first position relaxing the seat cover and a second position tensioning the seat cover, thereby varying the flexibility of the seat part, and
  - a second guy device, disposed in the second guy trench of the seat system, having a second guiding element attached to a second outer area of the seat cover and movable relatively to the cushion foam between a third position relaxing the seat cover and a fourth position tensioning the seat cover, thereby varying the flexibility of the seat part.

9. The motor vehicle according to claim 8,
further comprising a third guy trench positioned substantially orthogonal to the first guy trench, and
wherein the adjusting device includes a third guy device, disposed in the third guy trench of the seat system, having a third guiding element attached to a third outer area of the seat cover and movable relatively to the cushion foam between a fifth position relaxing the seat cover and a sixth position tensioning the seat cover, thereby varying the flexibility of the seat part.

10. A method for operating a seat system of a motor vehicle having at least first and second seat parts, each of which has a cushion foam spanned by a seat cover, and an adjusting device, comprising:
varying flexibility of the first seat part by movement of the adjusting device, the adjusting device including at least one guy device, disposed in a guy trench of the seat system, having
- a guiding element attached to an outer area of the seat cover of the first seat part, the guiding element being moved relatively to the cushion foam between a first position relaxing the seat cover of the first seat part and a second position tensioning the seat cover of the first seat part, thereby varying the flexibility of the first seat part without any change in the second seat part;
- at least one housing element fixed to the cushion foam,
- an adjusting element disposed rotatably with respect to the housing element, and
- at least one retaining element having one end area attached to the guiding element and an opposing end area connected to the adjusting element via a screw connection, by which the guiding element is movable relatively to the cushion foam.

11. The method according to claim 10, further comprising automatically moving the guiding element into the first position relaxing the seat cover of the first seat part when the seat system is not occupied by a person, and into the second position tensioning the seat cover of the first seat part when the seat system is occupied.

* * * * *